US006480867B1

United States Patent
Kwan

(10) Patent No.: US 6,480,867 B1
(45) Date of Patent: Nov. 12, 2002

(54) SYSTEM AND METHOD FOR MANAGING FILESYSTEM OBJECTS IN A MULTILINGUAL DISTRIBUTED ENVIRONMENT

(75) Inventor: David Taiwai Kwan, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,651

(22) Filed: Jul. 6, 1999

(51) Int. Cl.[7] .............................................. G06F 15/00
(52) U.S. Cl. ............................ 707/536; 707/1; 707/10; 709/245; 709/246
(58) Field of Search ............................... 709/246, 245; 707/1, 10, 536

(56) References Cited

U.S. PATENT DOCUMENTS

| 5,428,772 A | | 6/1995 | Merz ........................... 395/600 |
| 5,448,043 A | | 9/1995 | Nakano et al. ............... 235/379 |
| 5,568,639 A | | 10/1996 | Wilcox et al. ............... 395/600 |
| 5,579,517 A | | 11/1996 | Reynolds et al. ........... 395/616 |
| 5,687,366 A | | 11/1997 | Harvey, III et al. ........ 395/610 |
| 5,715,466 A | | 2/1998 | Flanagan et al. ........... 395/755 |
| 5,751,957 A | * | 5/1998 | Hiroya et al. ............... 709/203 |
| 5,758,352 A | | 5/1998 | Reynolds et al. ........... 707/200 |
| 5,761,675 A | | 6/1998 | Isenberg ...................... 707/200 |
| 5,793,381 A | * | 8/1998 | Edberg et al ............... 345/467 |
| 5,987,402 A | * | 11/1999 | Murata et al. ................. 704/2 |
| 6,049,822 A | * | 4/2000 | Mittal ......................... 709/217 |
| 6,067,413 A | * | 5/2000 | Gustafsson et al. ......... 395/701 |
| 6,092,790 A | * | 7/2000 | Dobmeier et al. .......... 254/323 |
| 6,252,589 B1 | * | 6/2001 | Rettig et al. ................ 345/333 |

* cited by examiner

Primary Examiner—Saleh Najjar
(74) Attorney, Agent, or Firm—Sawyer Law Group LLP

(57) ABSTRACT

System and method aspects for filesystem management in a multilingual distributed computer environment are described. A system includes at least one server system for storing filesystem objects. A remote system is further included for remotely performing filesystem management operations on the filesystem objects of the at least one server system. At least one client system is provided for the at least one server system to support remote access to the filesystem objects by the remote system through a client agent, the client agent providing Unicode encoding of filesystem objects passed between the remote system and the at least one server system to ensure conversion of filesystem objects to a universal translation form, wherein proper recognition and management of filesystem objects occur in the remote system of the multilingual distributed computer environment.

19 Claims, 8 Drawing Sheets

SYSTEM AND METHOD FOR MANAGING FILESYSTEM OBJECTS IN A MULTILINGUAL DISTRIBUTED ENVIRONMENT

RELATED APPLICATIONS

The present invention is related to co-pending U.S. Patent application entitled "System and Method for Remotely Accessing a Client in a Client Server Environment", Ser. No. 09/191,256 (docket SA9-98-160), assigned to the assignee of the present invention which is now pending.

FIELD OF THE INVENTION

The present invention relates generally to remote access to filesystem data in a distributed environment, and more particularly to filesystem object encoding to support remote access in a multilingual distributed environment.

BACKGROUND OF THE INVENTION

Today's major operating systems offer flexibility in naming filesystem objects. Some operating systems offer almost limitless length and varying character combinations when naming filesystem objects, e.g., names for directories, sub-directories, folders, and files. For example, the historical "eight-dot-three" naming convention restriction of DOS computers is no longer strictly utilized. By way of example, users on Japanese systems are able to name filesystem objects with Kanji characters, while users of Russian systems are able to name filesystem objects using Cyrillic characters. While improving usability on an individual system level, storage administrators face challenges in managing these filesystem objects in a distributed environment. A main challenge arises from the fact that the different languages span different coded character sets.

Network file access protocols have emerged that allow access to file system objects that reside on a remote machine. However, these protocols often restrict the character set of the names of the filesystem objects. Further, the client and the server may be required to run the same operating system in the same language. For example, when an English Windows 95 system maps to a network drive of a Japanese Windows 95 system, the user on the English system is unable to access any file or directory on the Japanese system that contains Japanese characters in its name due to the inability to render the Japanese characters on the English system or, more seriously, the inability to recognize that the filesystem objects exist at all.

In order to illustrate the problem more particularly, FIG. 1a provides a screen capture shot (i.e., screen shot) of filesystem objects viewed locally on a Chinese machine. An open sub-directory 10 contains Chinese characters in its name, as well as files and sub-directories 12 with Chinese characters in their names. When an attempt is made to view the same sub-directory 10 on a remote English machine, problems result, as shown in the screen shot of FIG. 1b. As illustrated by the screen shot of FIG. 1b, the filesystem object 10 having the Chinese characters in its name is not displayed correctly, while its sub-directories and files 12 are not even recognized as existing in the English machine, and thus, are not displayed at all. The inability to recognize all filesystem objects severely hampers achieving complete and accurate system management.

Accordingly, a need exists for access and management capabilities for filesystem objects regardless of the operating system platform and language environment on which the filesystem objects reside. The present invention meets these needs.

SUMMARY OF THE INVENTION

The present invention provides system and method aspects for filesystem management in a multilingual distributed computer environment. A system includes at least one server system for storing filesystem objects. A remote system is further included for remotely performing filesystem management operations on the filesystem objects of the at least one server system. At least one client system is provided for the at least one server system to support remote access to the filesystem objects by the remote system through a client agent, the client agent providing Unicode encoding of filesystem objects passed between the remote system and the at least one server system to ensure conversion of filesystem objects to a universal translation form, wherein proper recognition and management of filesystem objects occur in the remote system of the multilingual distributed computer environment.

The present invention allows a storage administrator to access and manage remote filesystem objects regardless of the operating system platform and language environment on which the filesystem objects reside. The invention incorporates Unicode to encode characters in a distributed environment to allow crossing of operating system platform boundaries, as well as language boundaries, during remote system management. These and other advantages of the aspects of the invention will be more fully understood in conjunction with the following detailed description and accompanying drawings.

DETAILED DESCRIPTION OF THE INVENTION

The present invention is related to remote access for filesystem management of filesystem objects in a multilingual distributed environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

It should be appreciated that the computer programming code according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code on a network for remote execution.

The present invention utilizes a distributed storage management client facility wherein the storage can be managed in a robust and distributed fashion, as described in the aforementioned related, co-pending U.S. Patent application, portions of which have been included herein. Through a distributed storage management, a client in a client-server system can be accessed remotely through a web browser, such as Netscape Navigator or Microsoft Internet Explorer. For example, a user at home can access a client machine at the office and subsequently backup the client to a server (or restore a file from a server to the client machine in the office). The user can also migrate and recall, archive and retrieve files to the client from the server. Similarly, a system administrator at a central location can access a client machine and initiate these client functions to the server.

Figure 1A:
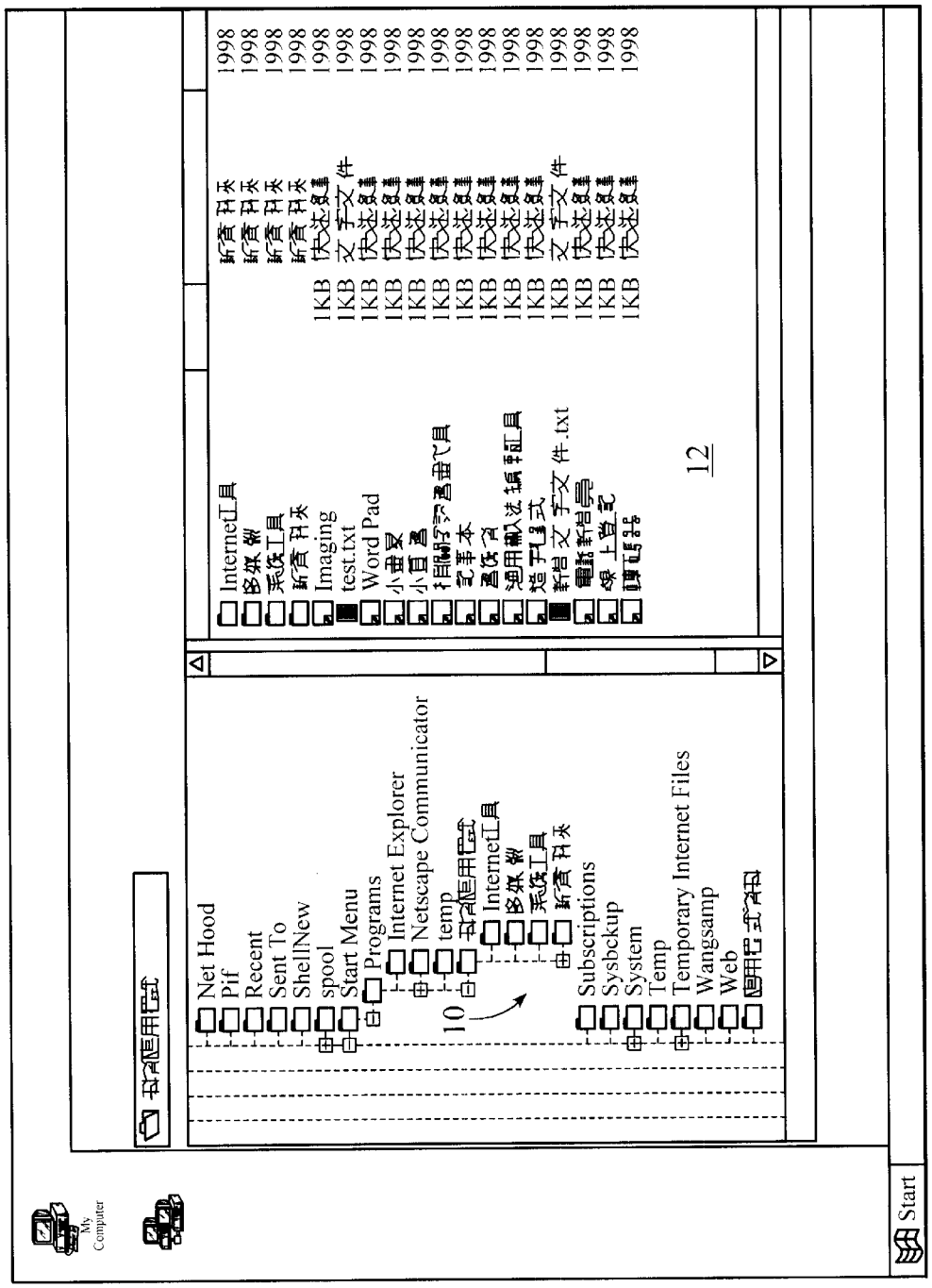
FIG. 1a illustrates a screen shot of filesystem objects viewed locally on a Chinese system.
Figure 1B:
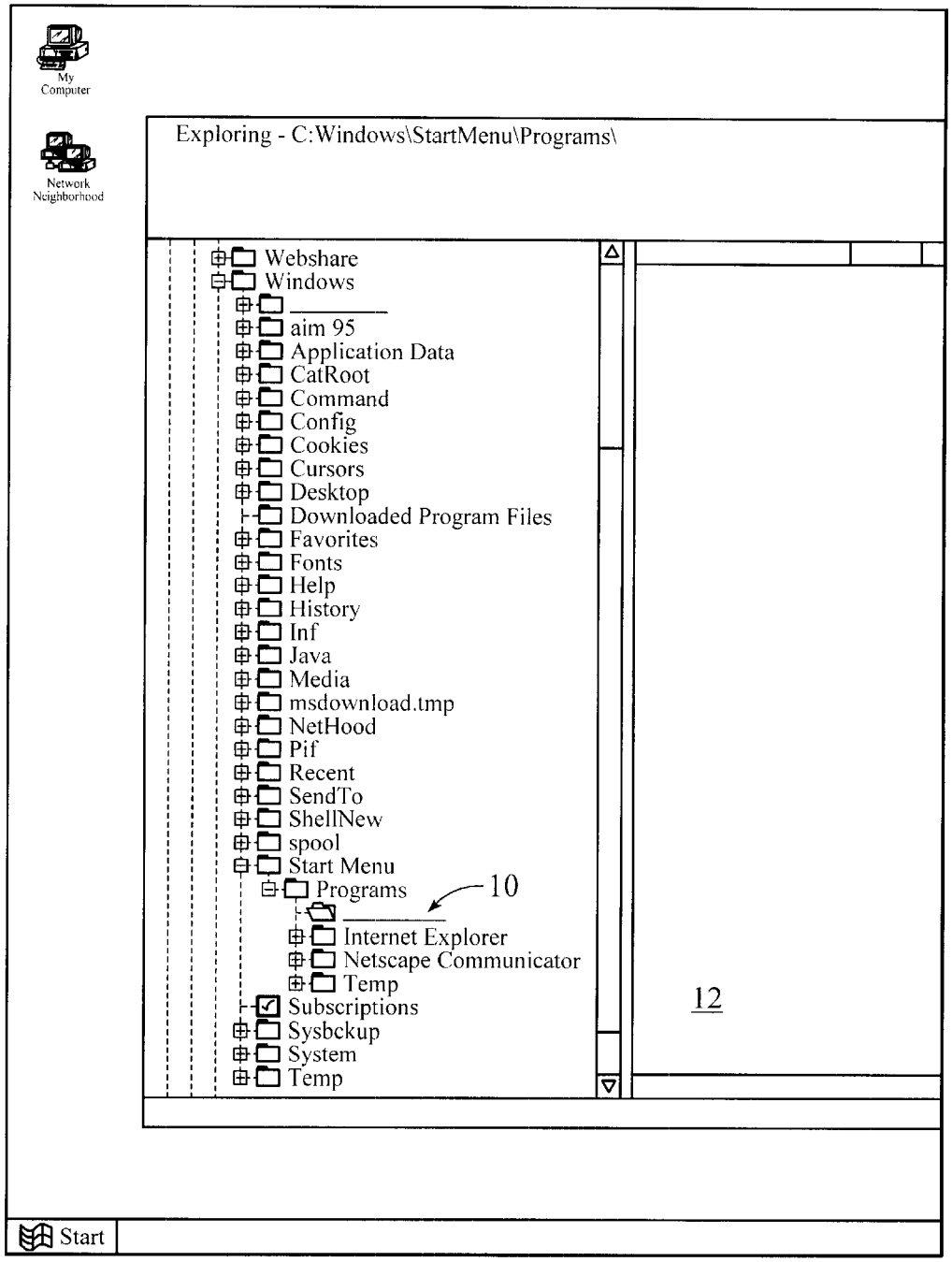
FIG. 1b illustrates a screen shot of an English system lacking recognition of the filesystem objects of the Chinese system of FIG. 1a when remotely accessing the Chinese system.
Figure 2:
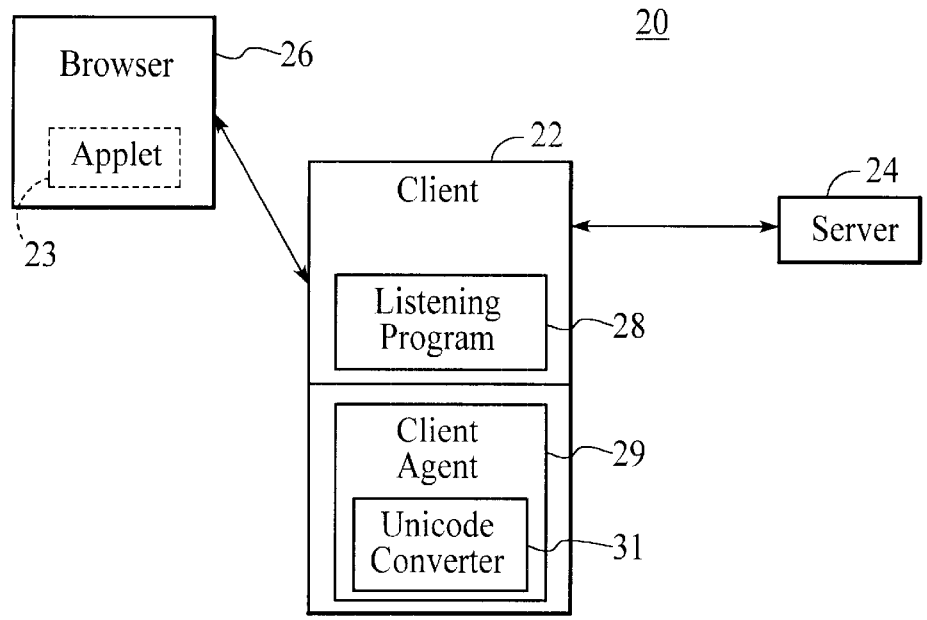
FIG. 2 illustrates a block diagram of a distributed client in a distributed environment according to the present invention.

FIG. 2 illustrates remotely accessing a client. The remote client access system 20 includes a server 24, a client 22, and a browser 26. The browser 26 is any web browser such as Netscape Navigator or Microsoft Internet Explorer. The client 22 includes a listening agent program 28, such as a hyper-text transport protocol (HTTP) daemon facility, and a client agent 29 that sets up the communication between the client 22 and browser 26, and between the client 22 and server 24.

Figure 3:
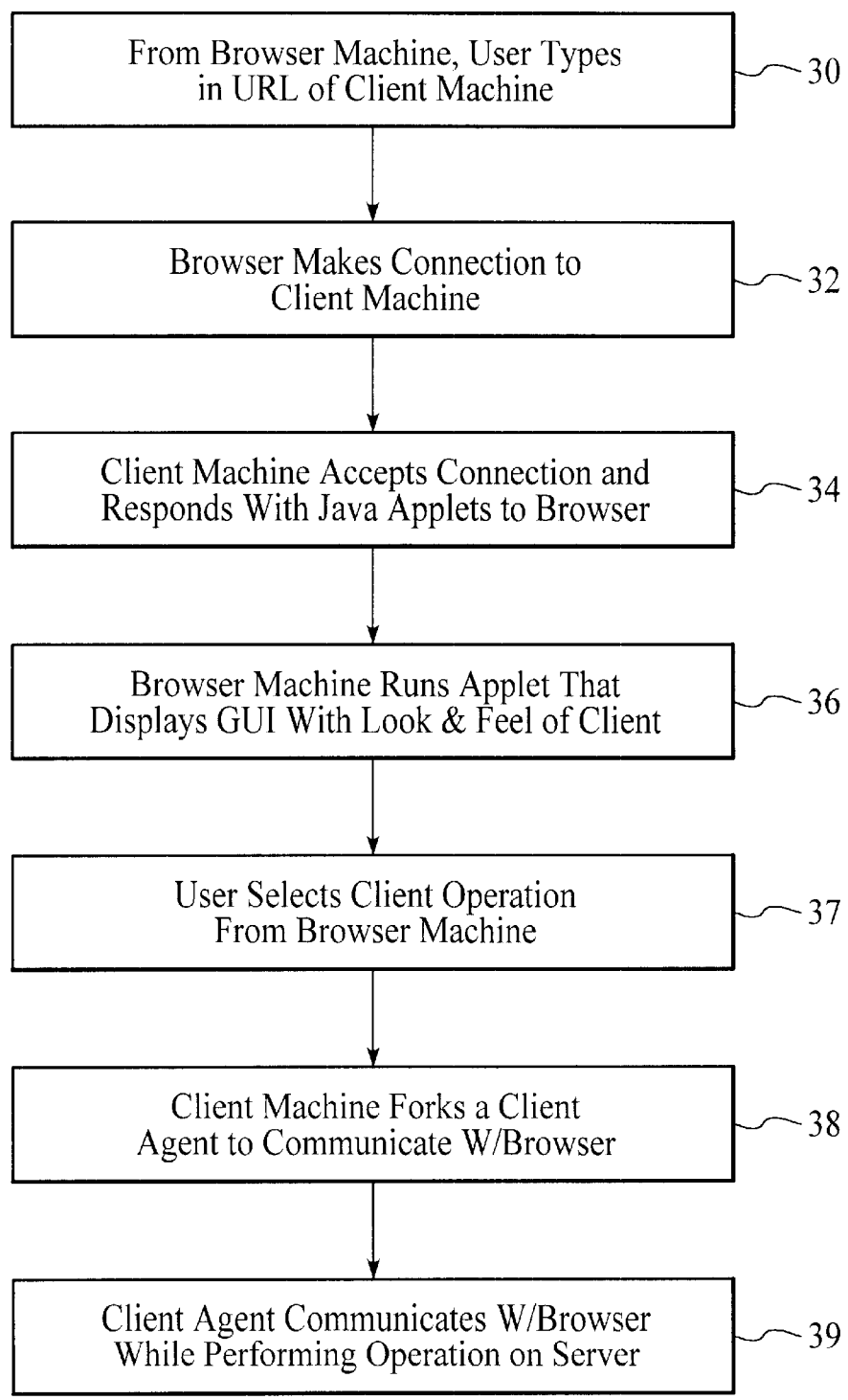
FIG. 3 illustrates a flow chart depicting the access to the client according to the present invention.

A preferred method for remotely accessing the client 22 is described generally in connection with the flow diagram of FIG. 3. At step 30, from the browser 26, a user enters information about the client 22 they want to access at the universal resource command line (URL). The request is in the form of the machine name and HTTP port number, separated by a colon. At the client machine 22, the listening program 28 is listening at this defined port, and keeps track of contact made to the client 22. If contact is made (for example, as described in step 30 above), the listening program 28 responds with the port number for establishing the next communication with that client machine 22. Next, at step 32, the browser 26 makes a connection to the client machine 22. In the client machine 22, the listening program 28 accepts the connection from the browser 26, and serves a response such as a JAVA applet back to the browser 26 at step 34. The response or JAVA applet contains a GUI (graphical user interface). The GUI could be a fully functional GUI that has the same look and feel as the client software running on the client machine, or could be as simple as a command line interface. The response also contains the command verbs or APIs to allow client operations to take place from the browser 26. These verbs are structured such that communications between the client agent 29 and applet 23 running at the browser 26 are both language independent and machine independent. This is accomplished by tailoring the verbs to the specific application that the client performs without language or machine type dependencies. Furthermore, all character elements in the verb are encoded in Unicode in accordance with the present invention. Next, at step 36, the browser 26 displays the client GUI. At step 37, the user selects a client operation from the GUI displayed. For security purposes, an ID and password can be required. The ID and password may be encrypted at the browser 26 and decrypted at the client agent 29, also for security reasons. The level of access to client operations can be controlled by this ID and password received from the browser. A client agent 29 is then spawned to perform the requested operation and communicate with the browser 26. The client agent 29 contains the conventional client bundled with a layer of communications interface that allows the client machine 22 to be accessed directly or remotely. The communications interface contains a set of verbs or APIs that are understood by both the client 22 and applet 23 running in the browser 26. In accordance with the present invention, the client agent 29 further includes a Unicode converter 31, as described hereinbelow with reference to FIG. 6, to provide character encoding of filesystem object names being communicated to/from the applet 23 running in the browser 26. At step 39, the client agent 29 communicates back and forth with the applet on the browser 26 in this protocol (that includes verbs for sending and receiving information needed to display to the user through the GUI). When the client request is completed, the client agent 29 waits for additional requests, if any.

Figure 4:
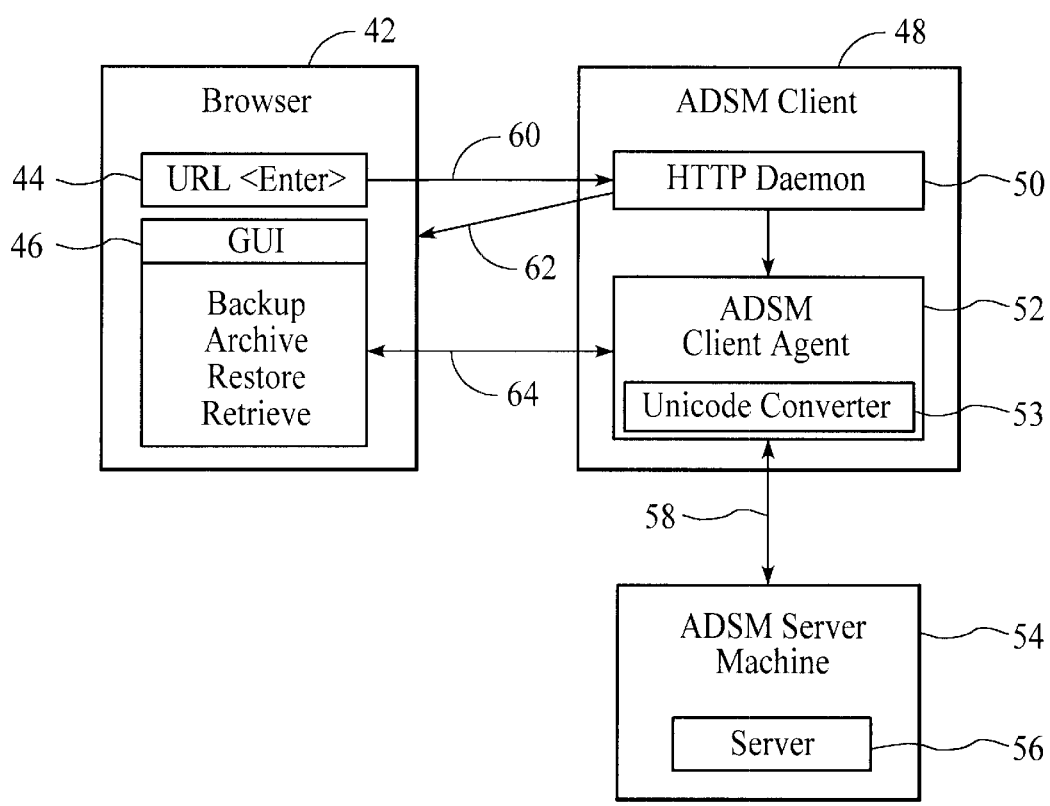
FIG. 4 illustrates a block diagram representation of the distributed client of the present invention in a distributed storage management software application.
Figure 5A:
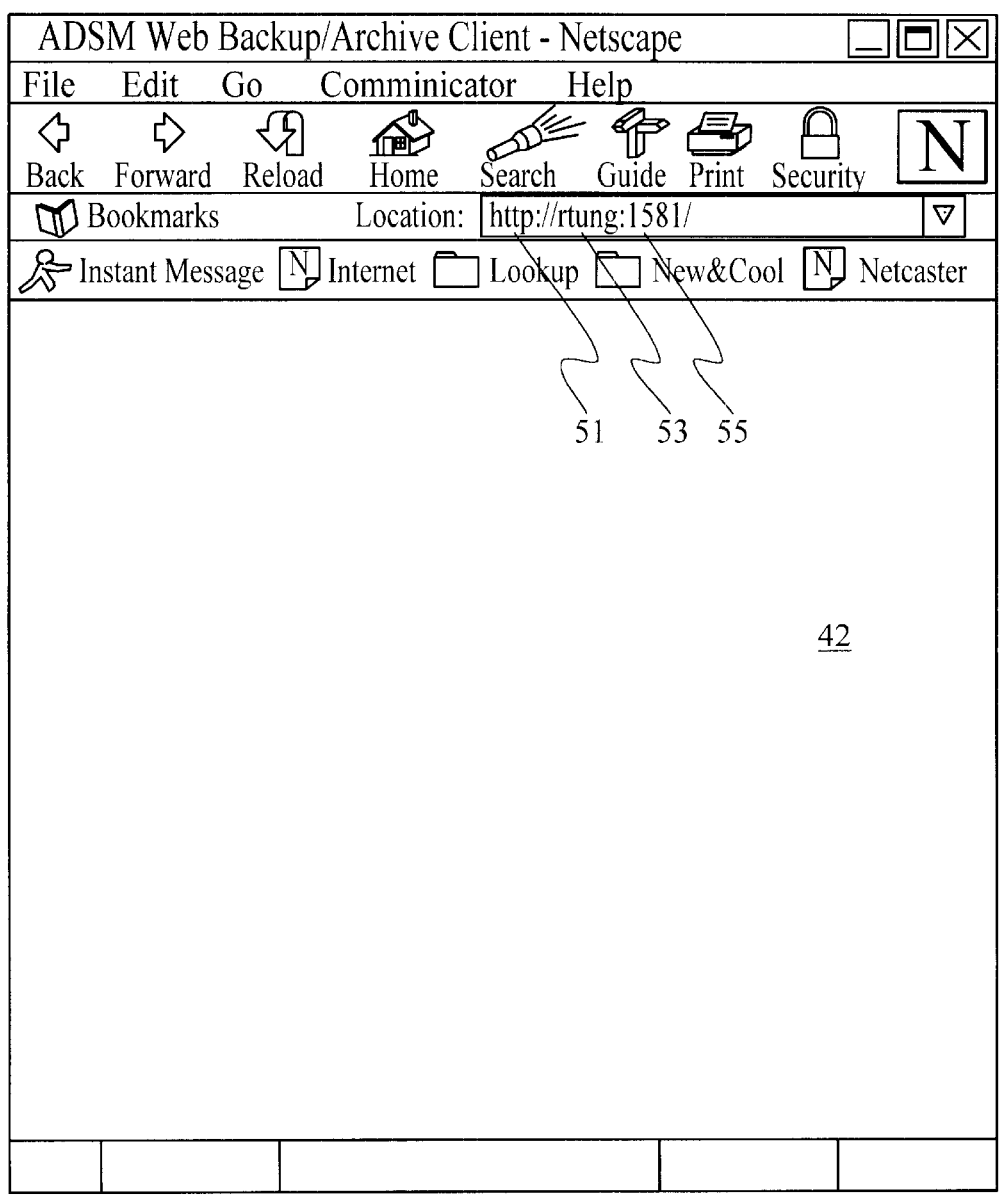
FIGS. 5a–5b illustrate screen shots when remotely accessing a client according to the present invention.
Figure 5B:
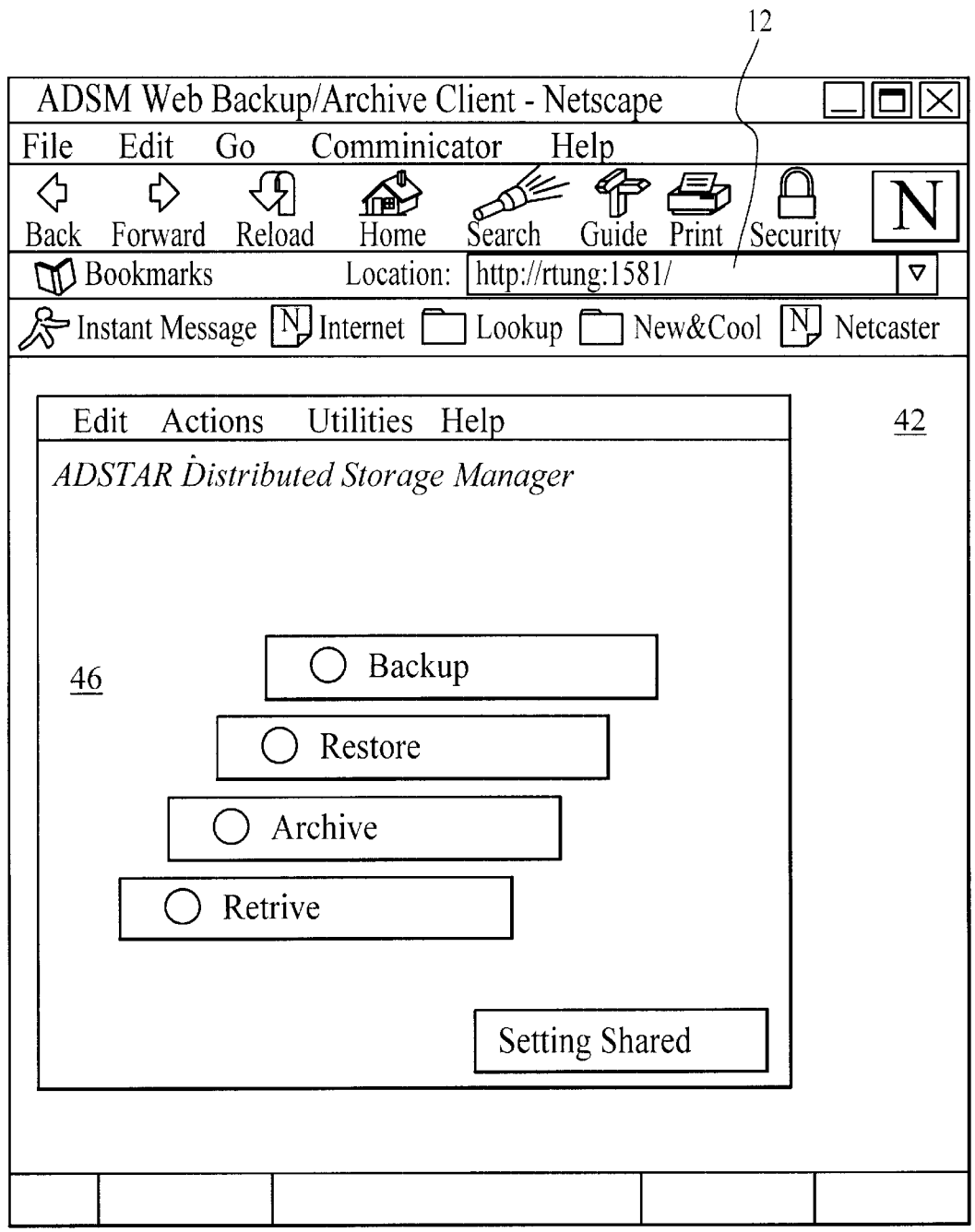

FIG. 4 is a block diagram which shows the system and method for a distributed client in the context of a client-server storage management software product such as Adstar Distributed Storage Management software (ADSM) from IBM Corporation. Here, the system 40 includes a browser 42, a client machine 48, and a server machine 54 which includes an ADSM server 56. Here, the user enters the ADSM client machine name and ADSM client HTTP port number, separated by a colon, at the URL 44 in the browser 42. By way of example, FIG. 5a shows a browser such as a Netscape Navigator browser. At the URL 51, the user enters the ADSM machine name 53 and HTTP port number 55 separated by a colon. Referring back to FIG. 4, over connection 60, which may be a network connection, the browser 42 establishes communication with the distributed storage management client 48. At the distributed storage management client 48, the HTTP daemon (listening program) 50 in the ADSM client 48 accepts the connection, and serves a JAVA applet using connection 62 back to the browser 42. The browser 42 then displays the ADSM client GUI 46. FIG. 5b shows the display of the GUI 46 at the browser 42 from the applet received from the HTTP daemon on the ADSM client machine 48. As can be seen in FIG. 5b, the GUI 46 provides the same look and feel as login access directly on the client machine 48 would appear. Here, the user selects a filesystem management operation to be performed. For example, the user clicks on Backup from the GUI 46, and is prompted for an ID and password. This is communicated back to the ADSM client 48 over connection 64. At the ADSM client 48, the HTTP daemon 50 spawns the ADSM client agent 52. The ADSM client agent 52 then sends and receives all the information required to display the GUI to the end user, as well as communicating over connection 58 with the ADSM server 56 in the server machine 54 to perform the requested backup operation with Unicode encoding, as described with reference to FIG. 6.

Figure 6:
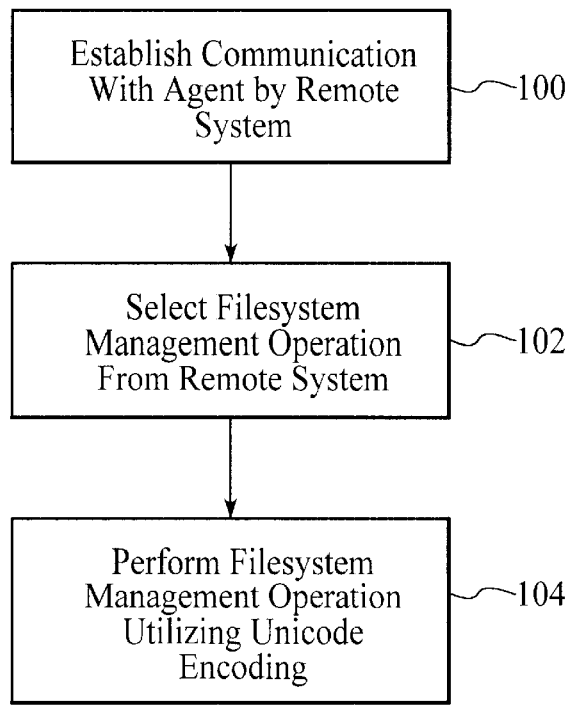
FIG. 6 illustrates a block flow diagram of remotely accessing a client to perform filesystem management operations with Unicode encoding for a multilingual distributed environment in accordance with the present invention.

In accordance with the present invention, support for a multilingual distributed environment, i.e., an environment in which the browser and client agent systems may operate with different local native languages and possibly different operating systems, occurs via a Unicode converter 53. The Unicode converter 53 provides code to perform conversion of character data, e.g., according to a conversion table stored in memory, in accordance with the Unicode standard. FIG. 6 illustrates an overall block flow diagram of a method for remotely accessing and managing filesystem objects in a multilingual distributed environment represented in the block diagram of FIG. 4. Remote access initiates with the establishing of a connection to the client agent 52 via the browser 42 (step 100), and selecting a filesystem management operation, e.g., a BACKUP operation, (step 102), as described hereinabove. The client agent 52 responds to a request for a filesystem operation by performing the filesystem operation with utilization of Unicode encoding (step 104). The agent 52 understands the filesystem structure and the character set encoding of the filesystem on which it operates. Thus, the agent 52 gets the names of the filesystem objects via the APIs provided by the operating system for the server machine 54. The filesystem APIs return the names of the filesystem objects. If the APIs require any passing of a string parameter, the agent 52 converts any parameters to the local character set of the filesystem. The filesystem APIs then return the names in the local character set as well. The agent 52 packages the filesystem object data as encoded Unicode through Unicode conversion before sending the packaged Unicode to the browser 42. The browser 42 then displays the received packaged Unicode using a tree metaphor. The packaging of the data in Unicode allows the names of these objects to be in any language.

Figure 7:
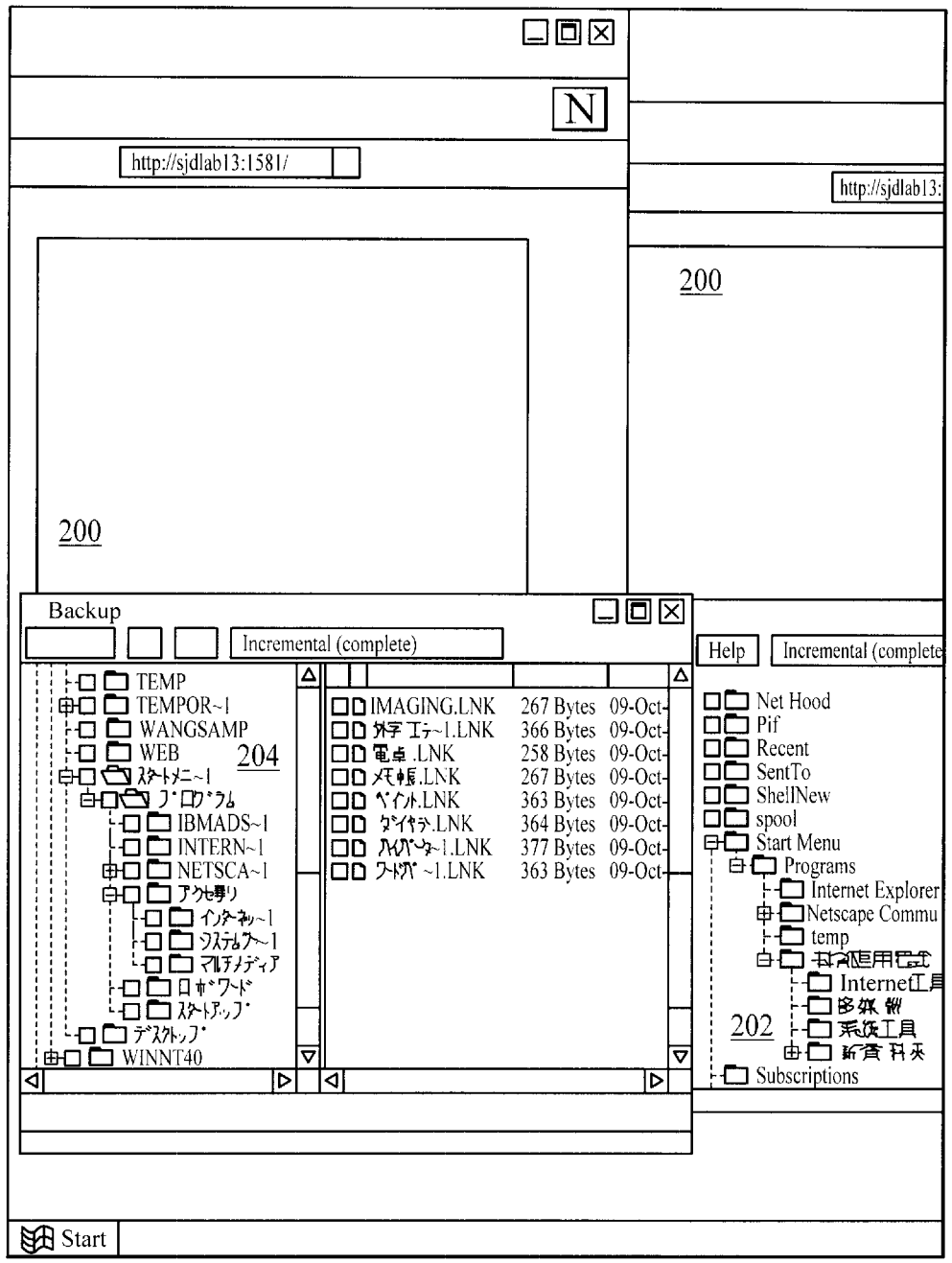
FIG. 7 illustrates a screen shot from a remote system showing proper recognition of filesystem objects from Japanese and Chinese machines on an English machine as an example for the present invention.

FIG. 7 illustrates a screen shot that demonstrate the ability of the present invention to provide access to data among machines operating in accordance with differing native languages with differing character sets. In the example of FIG. 7, from a browser running applet 200 of an English machine, an access to filesystem objects on two filesystems, a Chinese filesystem and a Japanese system, is made to perform a Backup operation. Through the use of a Unicode converter of a client agent for each of these filesystems, the filesystem objects of the Chinese filesystem and the Japanese filesystem are properly included and displayed on the English machine, as shown by windows 202 and 204, respectively. In addition to supporting any language, the present invention successfully operates in environments where the filesystem objects reside on platforms that differ from the platform on which the applet is run. In the example of FIG. 7, the applet 200 was run on remote machine operating in accordance with the Windows 95 operating system platform, the Japanese filesystem was provided on an OS/2 machine, and the Chinese filesystem was provided on a Windows NT machine. Thus, the present invention achieves accurate access and management capabilities from a remote machine in a distributed computer environment that crosses platform and language boundaries.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for filesystem management in a multilingual distributed computer environment, the system comprising:

at least one server system for storing filesystem objects;

a remote system for remotely performing filesystem management operations on the filesystem objects of the at least one server system; and at least one client system provided for the at least one server system for supporting remote access to the filesystem objects by the remote system through a client agent, the client agent providing Unicode encoding of names of filesystem objects passed between the remote system and the at least one server system to ensure conversion of the names of the filesystem objects to a universal translation form, wherein proper recognition and management of filesystem objects occur in the remote system of the multilingual distributed computer environment.

2. The system of claim 1 wherein the remote system accesses the at least one client system from a browser interface.

3. The system of claim 2 wherein the at least one client system provides a filesystem management interface to the remote system in response to the access.

4. The system of claim 3 wherein the remote system selects a filesystem management operation from the filesystem management interface.

5. The system of claim 3 wherein the filesystem management interface is provided as a JAVA applet.

6. The system of claim 1 wherein the at least one client system and the remote system operate in accordance with languages having differing local character sets.

7. The system of claim 1 wherein the at least one client system accesses the filesystem objects utilizing application program interfaces (APIs) appropriate for the at least one server system.

8. The system of claim 7 wherein the client agent provides string parameters for the APIs in a local character set of the at least one server system.

9. A method for remote, distributed filesystem management in a multilingual computing environment, the method comprising:

establishing communication between a filesystem via a filesystem agent and a remote system to select filesystem management operations by the remote system; and performing a selected filesystem management operation through the filesystem agent with Unicode encoding of names of the filesystem objects passed between the remote system and the filesystem for the selected filesystem management operation.

10. The method of claim 9 wherein establishing communication further comprises accessing the filesystem by inputting a machine name and port number in a universal resource command line of a browser interface on the remote system.

11. The method of claim 10 wherein establishing communication further comprises providing an applet for the filesystem management operations from the filesystem on the browser interface of the remote system.

12. The method of claim 9 wherein the step of performing further comprises accessing filesystem objects of the filesystem with the filesystem agent via application programming interfaces (APIs).

13. The method of claim 12 further comprising translating string parameters from Unicode into a local character set for the APIs.

14. A method for filesystem management in a multilingual, distributed environment, the method comprising the steps of:

querying a filesystem agent from a remote system of the distributed environment to perform a filesystem management operation;

accessing a filesystem through the filesystem agent for the filesystem management operation; and utilizing Unicode encoding for filesystem object data, including names of filesystem objects, transferred during the filesystem management operation between the remote system and the filesystem.

15. The method of claim 14 wherein accessing further comprises communicating with the filesystem through operating system application programming interfaces (APIs) of the filesystem.

16. The method of claim 15 wherein communicating further comprises providing parameters for the APIs in a local character set when required by the APIs.

17. The method of claim 16 further comprising converting filesystem object data being passed between the remote machine and the filesystem from the local character set to Unicode and from Unicode to the local character set via the filesystem agent.

18. The method of claim 14 further comprising selecting the filesystem management operation from a JAVA applet provided by the filesystem to the remote system.

19. A computer readable medium containing program instructions for supporting remote, distributed filesystem management in a multilingual computing environment comprising:

providing communication between a filesystem via a filesystem agent and a remote system to select filesystem management operations by the remote system; and performing a selected filesystem management operation through the filesystem agent with Unicode encoding of names of the filesystem objects passed between the remote system and the filesystem for the selected filesystem management operation.

* * * * *